No. 719,618. PATENTED FEB. 3, 1903.
J. P. SCOVILL.
PROCESS OF SHELLING PEAS, BEANS, &c.
APPLICATION FILED APR. 21, 1902.
NO MODEL.
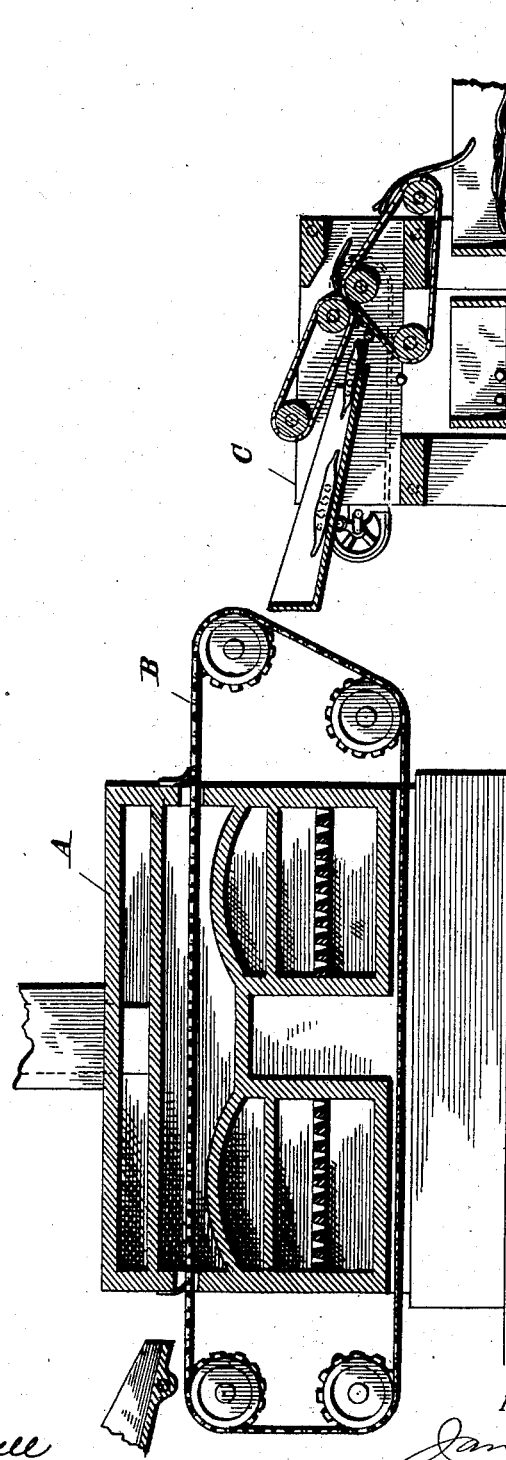
WITNESSES
INVENTOR

UNITED STATES PATENT OFFICE.

JAMES P. SCOVILL, OF CHICAGO, ILLINOIS.

PROCESS OF SHELLING PEAS, BEANS, &c.

SPECIFICATION forming part of Letters Patent No. 719,618, dated February 3, 1903.

Application filed April 21, 1902. Serial No. 104,050. (No specimens.)

*To all whom it may concern:*

Be it known that I, JAMES P. SCOVILL, a citizen of the United States, residing at Chicago, in the county of Cook and State of Illinois, have invented a certain new and Improved Process of Shelling Peas, Beans, and Similar Leguminous Vegetables, of which the following is a specification, reference being had to the accompanying drawing, which is a vertical longitudinal section of an apparatus for carrying out my process.

In the shelling of peas it is a fact well known to persons engaged in the canning industry that the softer and sweeter varieties— the green as distinguished from the hard white peas—are very difficult to handle without crushing and under the methods heretofore existing can only be shelled by hand and by a great expenditure of care and time. Indeed, so far is this true that these choicer varieties of peas are practically excluded from the canned-goods market, the hard white varieties, which can be shelled by the present styles of pea-shelling machines, being used almost exclusively by the canning factories of this country and the soft green peas being put up in limited quantities only in countries where low-priced labor is plentiful. After a great number and variety of experiments, however, I have discovered a process by which the soft green peas may be shelled with ease and rapidity and without crushing or injuring either by hand or by properly-designed machinery—such as is shown, for example, in the drawing annexed. This novel process consists in first heating the unshelled pods for a brief interval and then applying a pressure progressively along the pods to force or strip the peas from them. A temperature of about 212° is satisfactory for this purpose, and the peas may be subjected to this temperature either by dipping them in boiling water or the like or passing them through a heated chamber or oven. The interval of time during which the pods are thus heated should be very short in order not to injure them, a heating of from twenty-five to thirty seconds being found most desirable and effective for the purpose intended. After being thus treated the pods may be subjected to progressive pressure to expel the peas by simply drawing the pods through between the thumb and forefinger or by passing them between rolls, which will act progressively on the pods in a similar manner, and under this treatment the two halves of the previously-heated pod will readily split apart and the peas will be forced out from them without difficulty and without crushing.

In the drawing annexed, A is a suitable oven through which an endless conveyer B, adapted to hold the pods, is arranged to pass at a speed which will insure the proper heating of the pods. Adjacent to the discharge end of the conveyer in such position as to receive and operate on the pods while they are hot is a suitable hulling-machine—for example, as shown in my copending application, serially numbered 74,567, filed September 6, 1901.

The same process is also found equally effective for shelling beans, particularly Lima beans, which when thus treated can also be shelled in machines of the character set forth in my copending application above referred to, and, in fact, the shelling of any leguminous vegetable or fruit by heating the pods prior to manipulating them either by hand or by machinery to expel their contents from them will be understood as included within the broad spirit of the invention claimed.

I claim as my invention—

The improved process of shelling peas, beans, &c., which consists in first heating the pods for a brief interval and then applying pressure progressively along the pods to expel their contents, substantially as described.

In testimony that I claim the foregoing as my invention I affix my signature, in presence of two subscribing witnesses, this 12th day of August, A. D. 1901.

J. P. SCOVILL.

Witnesses:
HATTIE E. RANDELL,
JAMES D. JARVIS.